W. DONNELLY.
Plows.
No. 141,705. Patented August 12, 1873.
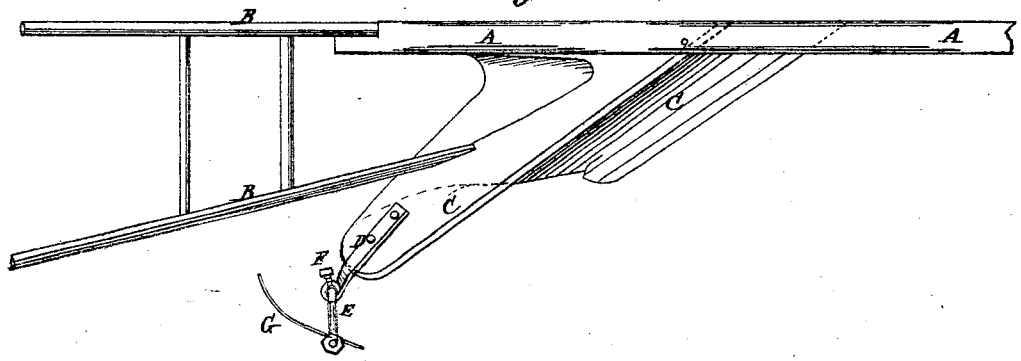
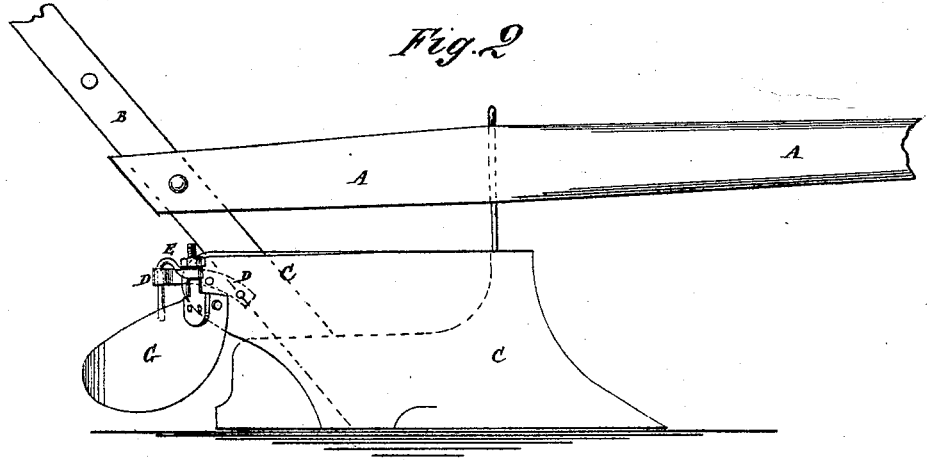
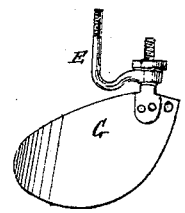
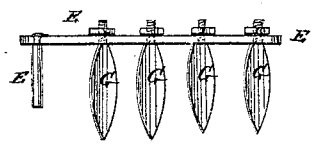
Witnesses:
A. W. Almqvist
D. Sedgwick
Inventor:
W. Donnelly
Per
Munn & Co
Attorneys.

UNITED STATES PATENT OFFICE.

WILLIAM DONNELLY, OF CALVERTON, NEW YORK.

IMPROVEMENT IN PLOWS.

Specification forming part of Letters Patent No. 141,705, dated August 12, 1873; application filed July 19, 1873.

*To all whom it may concern:*

Be it known that I, WILLIAM DONNELLY, of Calverton, in the county of Suffolk and State of New York, have invented a new and useful Improvement in Plows, of which the following is a specification:

Figure 1 is a top view of a plow to which my improvement has been applied. Fig. 2 is a side view of the same. Fig. 3 is a detail view of the furrowing attachment. Fig. 4 is a detail view of the covering attachment.

My invention has for its object to furnish an improved attachment for plows by means of which a furrow or channel may be opened in the soil of sufficient depth to receive the potatoes or other seed to be planted, and then cover said seed, thus saving the time and labor usually consumed in furrowing the ground and covering the seed. The invention consists in the crank provided with one or more plates, and secured adjustably by a set-screw to a bar attached to the mold-board of a plow, as hereinafter fully described.

A represents the beam, B the handles, and C the mold-board, of a plow, about the construction of which parts there is nothing new. To the upper rear part of the mold-board C is bolted the lower or inner part of the bar D, which bar is so bent or formed that its other or outer part may project horizontally, or nearly so. In the outer end of the bar D is formed a hole to receive the arm of the crank E, which is secured in place by a set-screw, F, which passes in through a screw-hole in the bar D, and bears against the arm of the crank E. By this construction the crank E may be raised, lowered, turned, or detached in an instant.

In the outer end of the crank E are formed one or more holes to receive the shank or shanks of one or more plates, G, which shanks are secured in place by nuts screwed upon their upper ends, as shown in Figs. 1, 2, 3, and 4.

For opening a furrow to receive the seed a single plate, G, is used, which should be made larger than the covering-plates, and may be curved to move the soil to one side. By this construction, by loosening the set-screw F the crank E may be raised and lowered to adjust the plate or plates G to enter the soil to a less or greater depth, as may be desired, and turned to adjust the said plates G to bear against the soil at a less or greater angle, as may be desired. This latter adjustment may also be effected by loosening the nuts upon the shanks of the said plate or plates G. A further adjustment is obtained by inserting the plate-shanks from the other side of the crank and passing the crank-arm into the hole in the bar D from the lower side, as indicated in Fig. 3.

In using the device, the crank E, with a single plate, G, is attached to the bar D, and the first furrow is plowed, the plate G opening a channel in the furrow-slice as it is turned over, in which channel a dropper places the seed at the proper distance apart. At the beginning of the next furrow the crank and single plate are detached, and a crank with a number of plates is attached, which, as the second furrow is plowed, cover the seed. One or two furrows are then plowed without the attachment, according as the rows are to be planted at a less or greater distance apart. The crank and single plate are then attached, and so on until the whole field is planted. The cranks are shifted in an instant at the ends of the furrows, as a single turn of the screw F will loosen or secure them.

The plow-beam may be provided with a keeper or bracket to carry the cranks when not in use.

Having thus described my invention, I claim as new and desire to secure by Letters Patent—

The crank E, provided with one or more plates, G, and secured adjustably by a set-screw, F, to a bar, D, attached to the mold-board of a plow, substantially as herein shown and described.

WILLIAM DONNELLY.

Witnesses:
J. HENRY PERKINS,
DANIEL W. SKIDMORE.